(12) United States Patent
Valentino

(10) Patent No.: US 12,140,988 B1
(45) Date of Patent: Nov. 12, 2024

(54) SYSTEM USING A PHOTON-BASED POWER PLANE AND SIGNAL TRANSMISSION MECHANISM TO ELECTRO-MAGNETICALLY ISOLATE AND ENHANCE THE PURITY OF OUTPUT FROM QUANTUM INFORMATION MEASUREMENT DEVICES AND TRANSMIT THEIR DATA TO A COMPUTING SYSTEM

(71) Applicant: John C. Valentino, Beverly Hills, CA (US)

(72) Inventor: John C. Valentino, Beverly Hills, CA (US)

( * ) Notice: Subject to any disclaimer, the term of this patent is extended or adjusted under 35 U.S.C. 154(b) by 525 days.

(21) Appl. No.: 17/186,878

(22) Filed: Feb. 26, 2021

Related U.S. Application Data

(60) Provisional application No. 62/982,044, filed on Feb. 26, 2020.

(51) Int. Cl.
*G06E 1/00* (2006.01)
*G08C 23/04* (2006.01)
*H04B 10/70* (2013.01)

(52) U.S. Cl.
CPC ............... *G06E 1/00* (2013.01); *G08C 23/04* (2013.01); *H04B 10/70* (2013.01)

(58) Field of Classification Search
CPC ............ G06E 1/00; G08C 23/04; H04B 10/70
See application file for complete search history.

(56) References Cited

U.S. PATENT DOCUMENTS

| | | | |
|---|---|---|---|
| 5,830,064 A | 11/1998 | Bradish et al. | |
| 6,016,038 A | 1/2000 | Mueller et al. | |
| 6,324,558 B1 | 11/2001 | Wilber | |
| 6,369,727 B1 | 4/2002 | Vincze | |
| 6,763,364 B1 | 7/2004 | Wilber | |
| 7,096,242 B2 | 8/2006 | Wilber | |
| 7,124,157 B2 | 10/2006 | Ikake | |
| 7,287,056 B2 | 10/2007 | Loveland et al. | |
| 7,752,247 B2 | 7/2010 | Wilber | |
| 9,152,381 B2 | 10/2015 | Valentino et al. | |
| 9,858,041 B2 | 1/2018 | Valentino et al. | |
| 10,896,024 B2 | 1/2021 | Valentino et al. | |
| 11,914,974 B2 | 2/2024 | Valentino et al. | |
| 2004/0263094 A1 | 12/2004 | Lister | |
| 2005/0136903 A1 | 6/2005 | Kashima et al. | |
| 2005/0236998 A1 | 10/2005 | Mueller et al. | |
| 2006/0020648 A1 | 1/2006 | Merati et al. | |
| 2008/0227419 A1 | 9/2008 | Traub | |

(Continued)

FOREIGN PATENT DOCUMENTS

WO  WO-2014200420 A1 * 12/2014 ............. H02S 50/15

OTHER PUBLICATIONS

PCT Form ISA/237, mailing date of Feb. 12, 2009 in correspondence with International Patent Application No. PCT/US2008/012623.

(Continued)

*Primary Examiner* — Mohammad K Islam

(74) *Attorney, Agent, or Firm* — Studebaker & Brackett PC

(57) ABSTRACT

In some illustrative embodiments, a self-powered system is provided that implements a Quantum Signal Generator where said signal generator is powered by a system with no external electrical connections. Other embodiments are as described above.

3 Claims, 9 Drawing Sheets

(56) References Cited

U.S. PATENT DOCUMENTS

| | | |
|---|---|---|
| 2009/0265112 A1 | 10/2009 | Wilber et al. |
| 2013/0010952 A1 | 1/2013 | Muise et al. |
| 2013/0036078 A9 | 2/2013 | Wilber |
| 2020/0266978 A1* | 8/2020 | Li .......................... H04B 10/64 |
| 2021/0036846 A1* | 2/2021 | Grice ..................... H04L 9/001 |
| 2021/0231496 A1* | 7/2021 | Chafekar ................. G01J 3/42 |

OTHER PUBLICATIONS

R. D. Nelson, et al., "FieldREG Anomalies in Group Situations", Journal of Scientific Exploration, 1996, vol. 10, No. 1, pp. 111-141.
Nelson et al., "FieldREG II: Consciousness Field Effects: Replications and Explorations", Journal of Scientific Exploration, 1998, vol. 12, No. 3, pp. 425-454.

\* cited by examiner

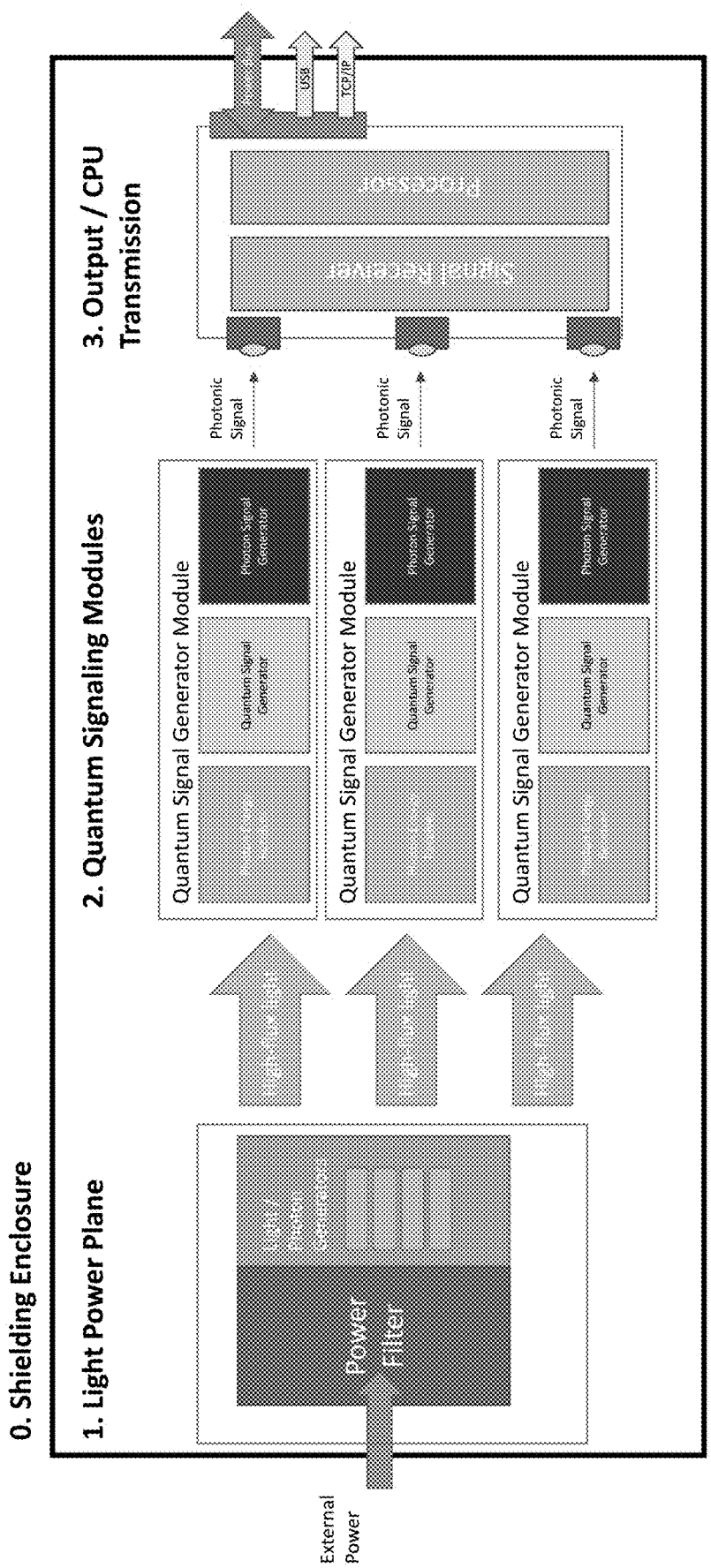
FIGURE 1: CONCEPTUAL DIAGRAM OF OVERALL SYSTEM

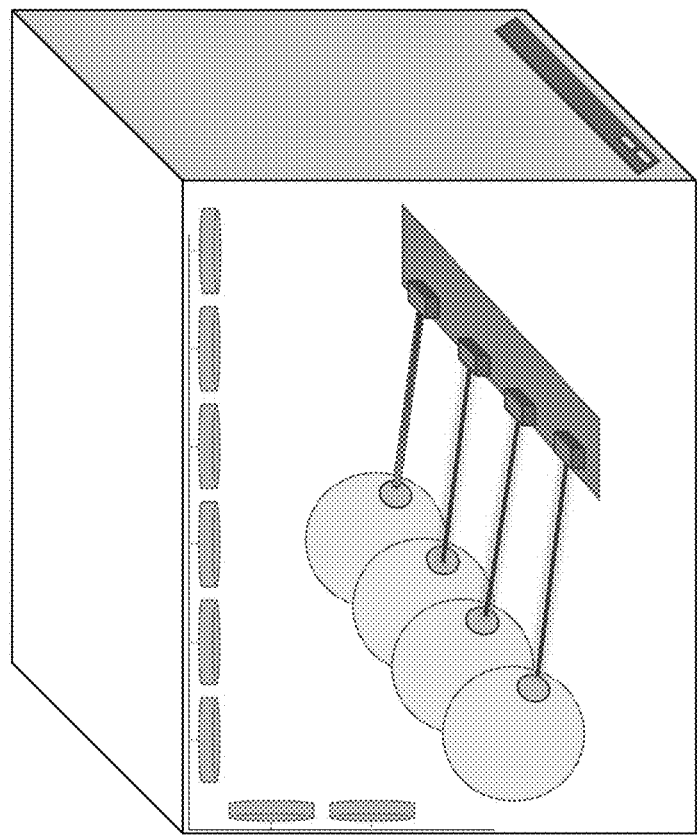
FIGURE 2B: Internal View (Sample Embodiment)
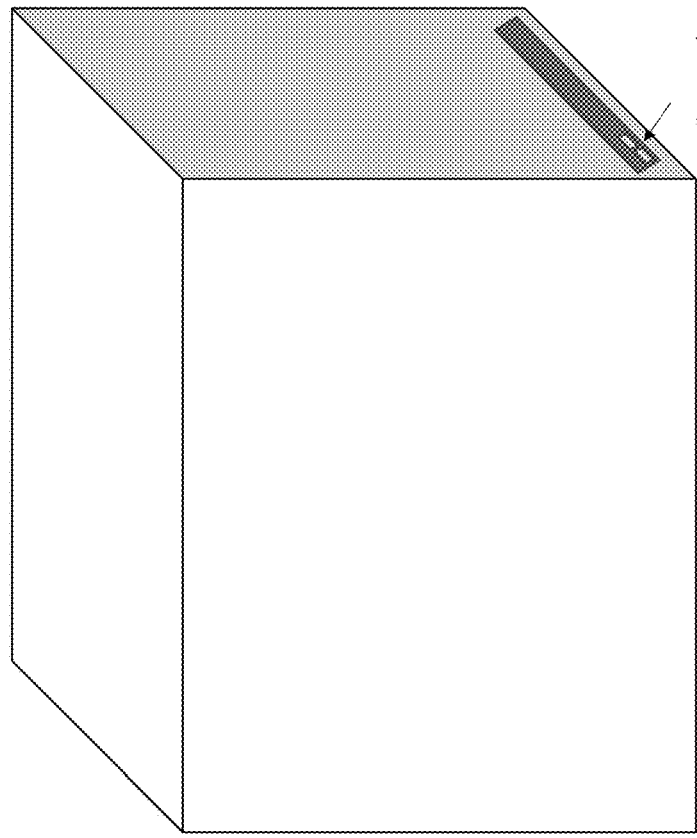
FIGURE 2A: External View (Sample Embodiment)
FIGURE 2: SHIELDING ENCLOSURE / EXTERNAL CASE

FIGURE 3B: Energy Receptor and Power Generation Apparatus
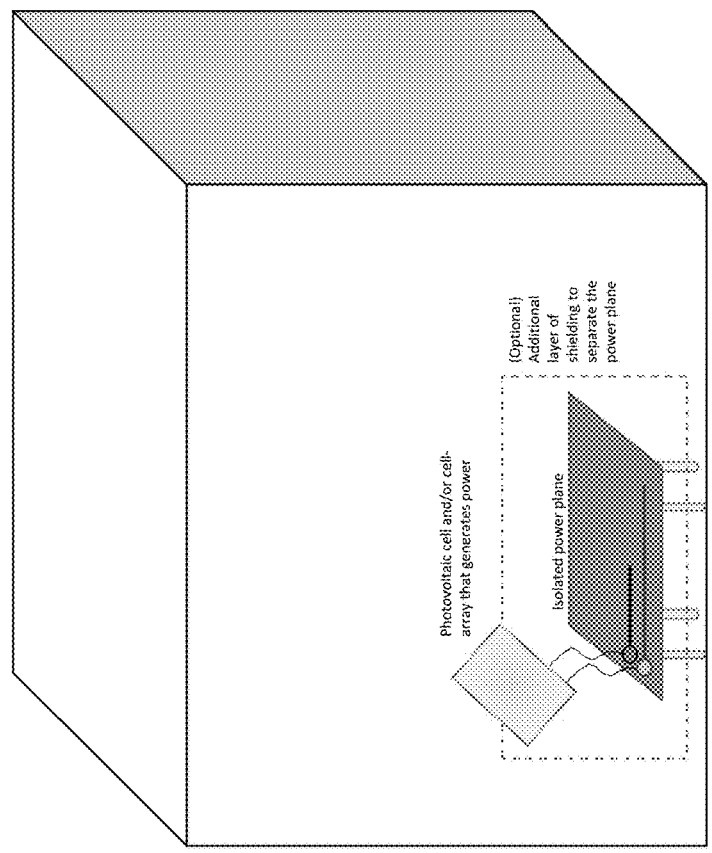
FIGURE 3A: Energy Generation and Transmission Apparatus (View from Inside of Enclosure)
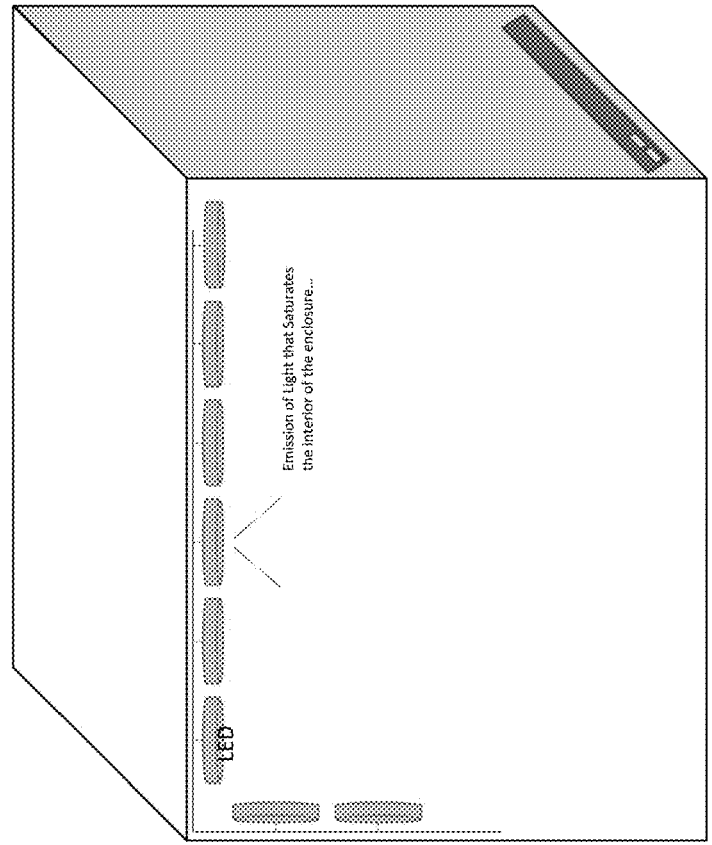
FIGURE 3: LIGHT POWER PLANE

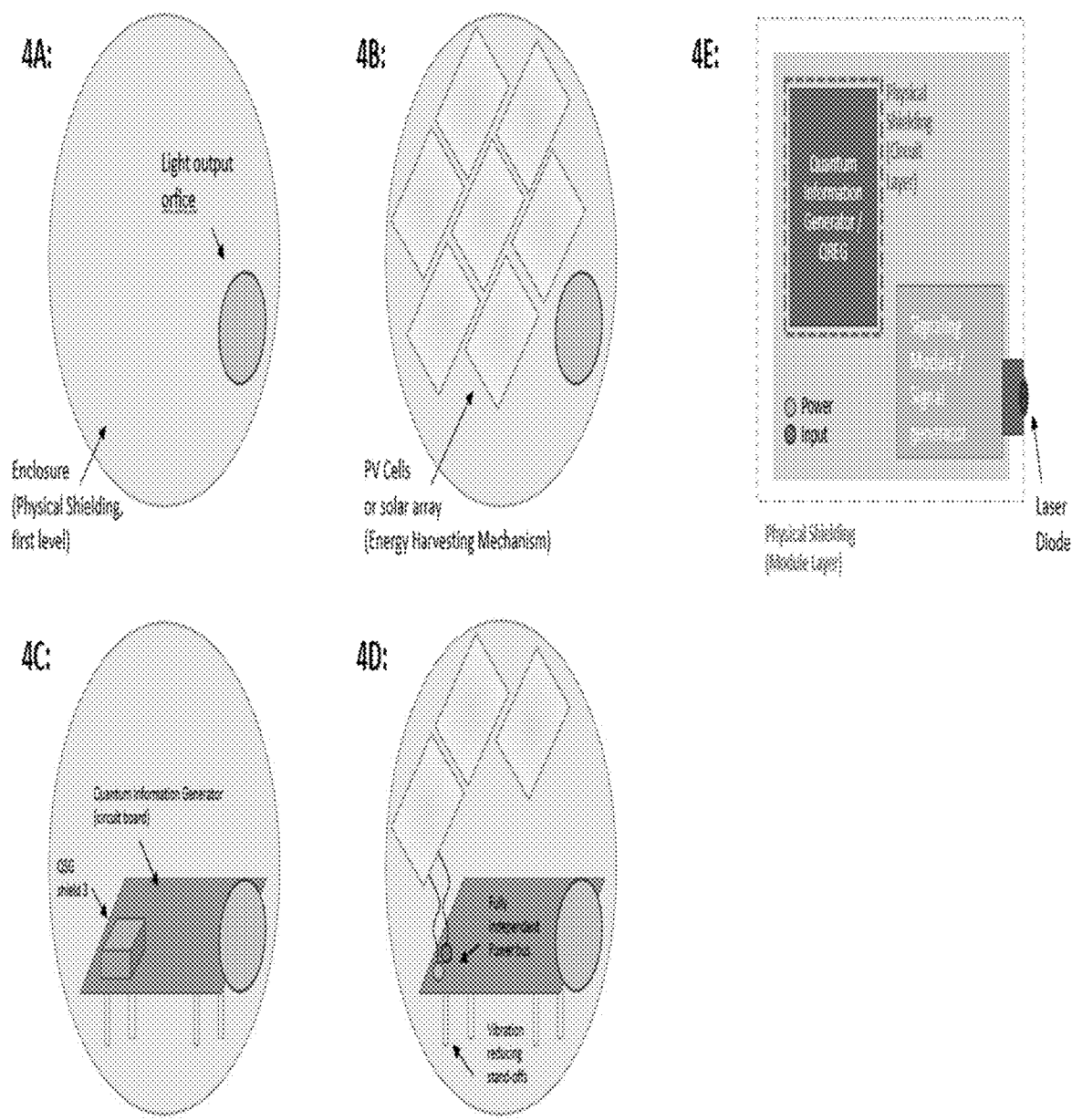

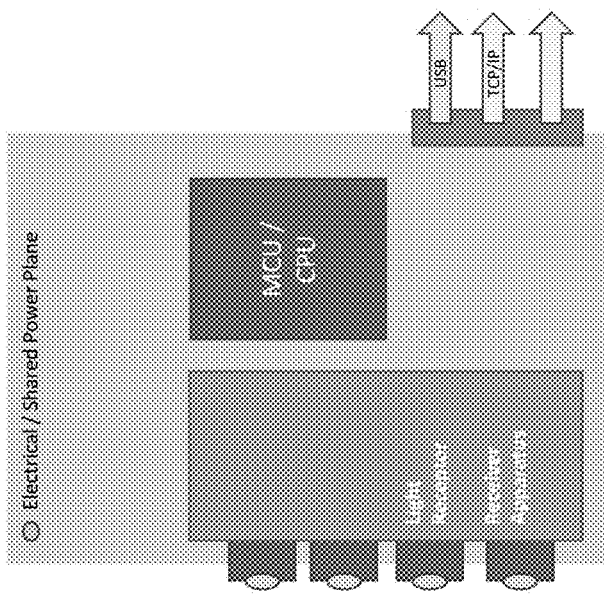
FIGURE 5: Output / Electrical Re-Integration Module

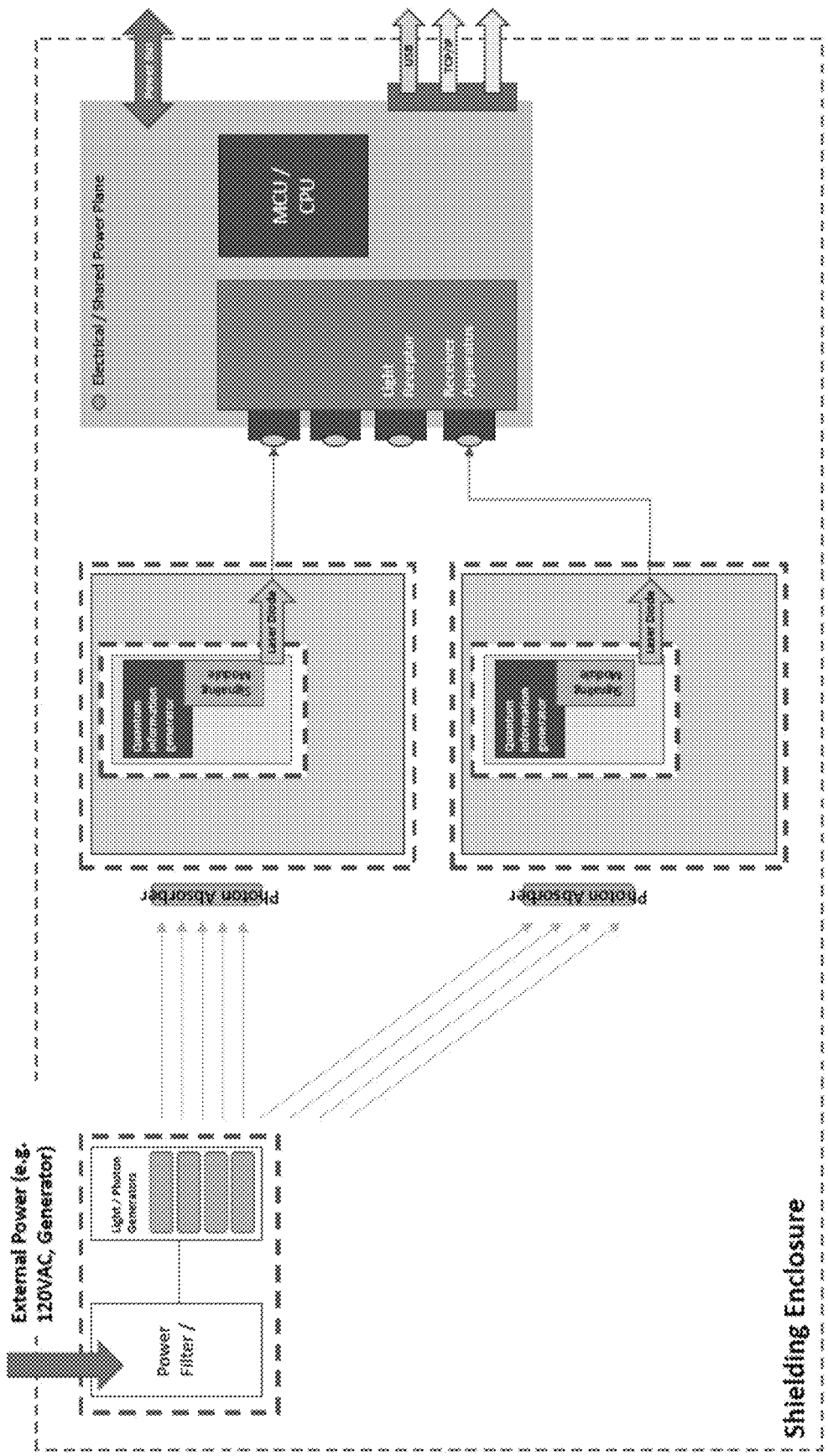
FIGURE 6A: ENHANCED CONCEPTUAL DIAGRAM

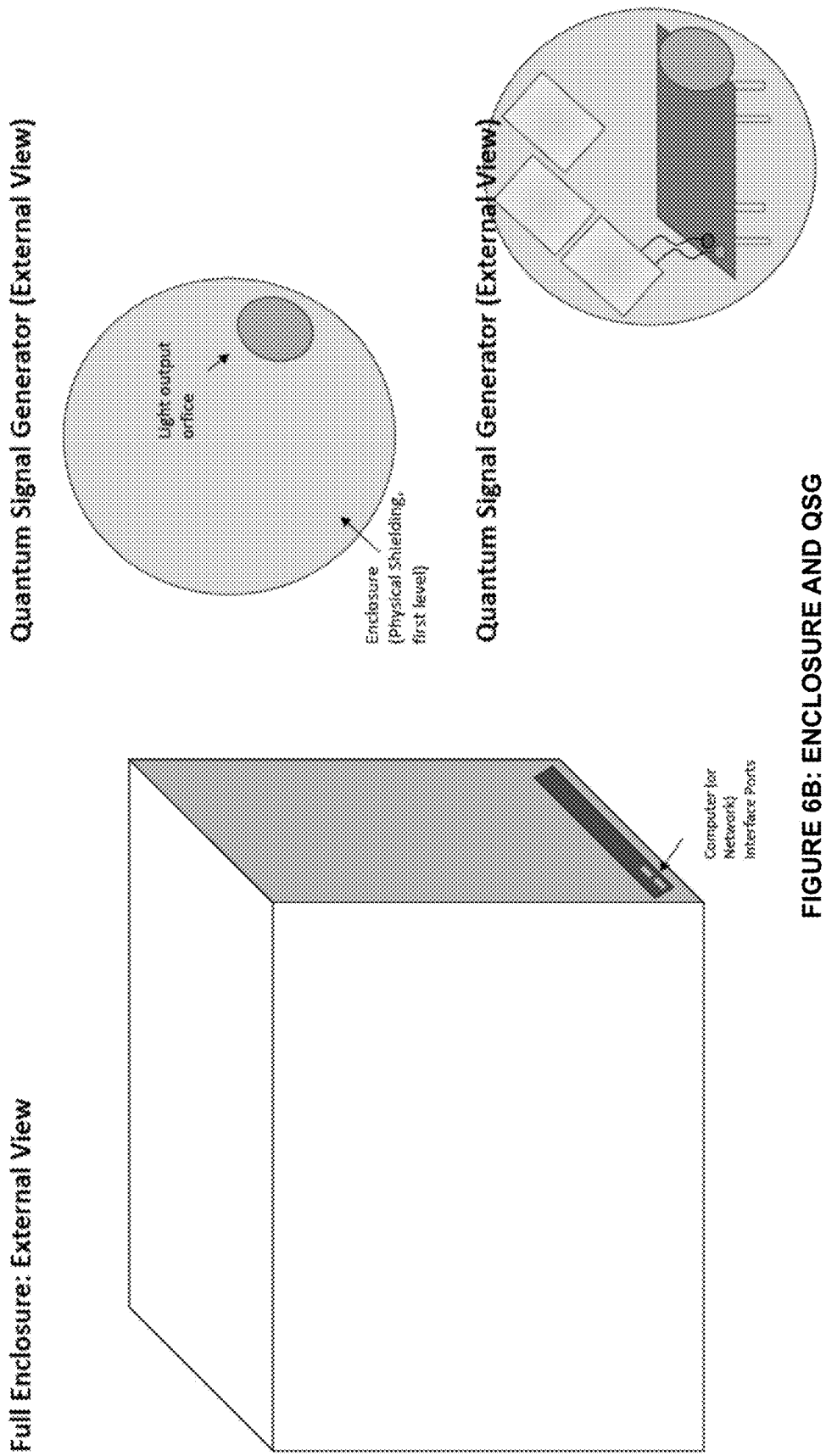
FIGURE 6B: ENCLOSURE AND QSG

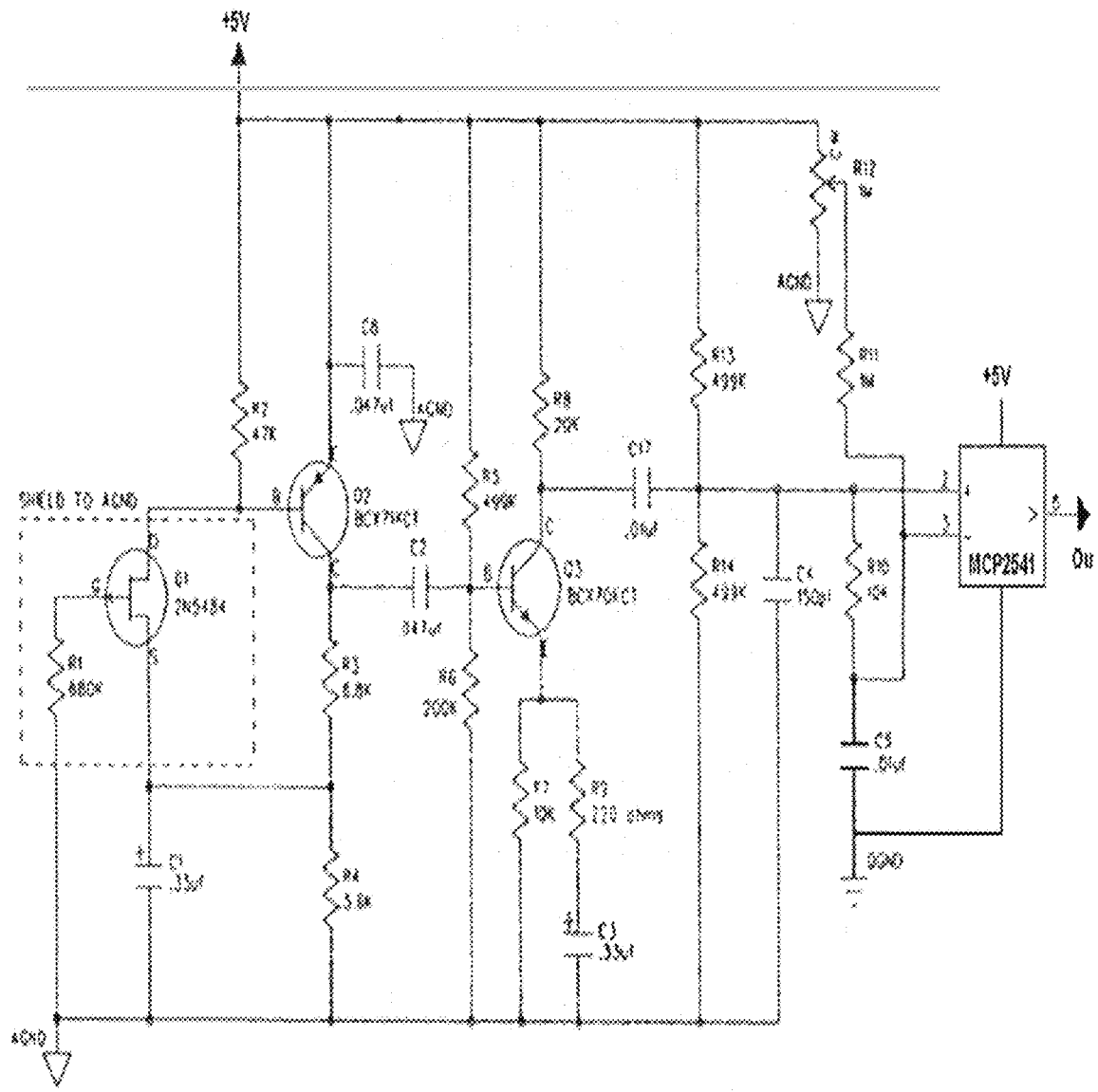
FIGURE 6C: QREG Circuit for Quantum Signal Generator

SYSTEM USING A PHOTON-BASED POWER PLANE AND SIGNAL TRANSMISSION MECHANISM TO ELECTRO-MAGNETICALLY ISOLATE AND ENHANCE THE PURITY OF OUTPUT FROM QUANTUM INFORMATION MEASUREMENT DEVICES AND TRANSMIT THEIR DATA TO A COMPUTING SYSTEM

The present application is a non-provisional of U.S. Patent Application Ser. No. 62/982,044, of John C. Valentino, filed on Feb. 26, 2020, the entire disclosure of which is incorporated herein by reference as though recited herein in full.

The present application improves upon the following prior patents of the present inventor, John C. Valentino, the entire disclosures of each of which prior patents are also incorporated herein by reference as though recited herein in full: U.S. Pat. No. 9,152,381 (issued Oct. 6, 2015); U.S. Pat. No. 9,858,041 (issued Jan. 2, 2018); and U.S. Pat. No. 10,896,024 (issued Jan. 19, 2021).

I. BACKGROUND

Quantum Random Event Generators (also referred to as "Quantum Random Number Generators" [QRNG/RNG], "True Random Number Generators" [TRNG], "Random Event Generators" [REG], Quantum Event Generators [QEGs]) are devices that generate and measure quantum-scale physical phenomena (e.g. electron tunneling, photon-scattering, shot noise, johnson noise, radioactive decay, etc) for some purpose. In many uses these systems create outputs that are thought to be fundamentally unpredictable ("random" or "uncertain") and employed in a variety of applications ranging from cryptography, cyber-security, and simulation to detecting the influence of conscious observers on physical outcomes. In addition to the technical challenges of developing a "pure" source of quantum uncertainty ("quantum signal") that is free of statistical artifacts, one of the most technologically challenging aspects of designing an effective Quantum Event Generator is insulating the signal generation apparatus from unwanted influences and interferences in the physical environment such as electrical, magnetic, thermal, and vibratory effects (collectively referred to as "noise")

An additional significant challenge is that the electrical circuit measuring and amplifying the quantum signal will often interfere with itself, or receive interference from the connections necessary to interface it with an output device—such as when the power bus provided by a computer-interface (e.g. a universal serial bus, thunderbolt, or other connection) or connection to the power grid introduces electrical, electromagnetic, or electrostatic artifacts into the circuit and diminishes the quality of the quantum signal.

This system makes use of a novel approach to power generation, signaling, shielding, and mechanical design to significantly protect and enhance the purity and quality of output of a wide variety of quantum signal generators, and to enable the injection of additional sources of quantum entropy (or quantum signal) in a way that is itself not susceptible to distortion by conventional physical processes and may enhance applications. In particular, the configuration described may enhance the ability of the system to interact with applications where the effects are based on quantum entanglement and non-local information transfer rather than classical electrostatic or electromagnetic interactions.

II. SUMMARY OF THE SYSTEM

Preferred embodiment: Quantum signal generators enclosed in spherical multi-layered metal alloys are energized by photovoltaic cells receiving power from an array of high-output Light Emitting Diodes ("Light-based power plane") inside a reflective enclosure ("Shielding Enclosure")

Readings from the signal generator are digitized and transmitted by laser or LED to a receiver apparatus inside the same enclosure but operating on a separate power circuit used for data transmission. The receiver apparatus is capable of communicating with a computer or external network device but completely electrically isolated from the generation apparatus. A digitized form of the signal is then sent to a computer using USB and/or broadcast over a network using TCP/IP. The light-based power plane (i.e. radiant energy from the LEDs leading to power generation in the quantum signal generators) may optionally be pulsed based on a control signal received from another apparatus.

[See: FIG. 1: CONCEPTUAL DIAGRAM OF OVERALL SYSTEM]

BRIEF DESCRIPTION OF THE DRAWINGS

The following is a brief description of the accompanying figures:

FIG. 1 is a conceptual diagram of an overall system according to some embodiments;

FIGS. 2A and 2B show internal and external views of a shielding enclosure according to some embodiments;

FIGS. 3A and 3B show light power plane Energy Generation and Transmission Apparatus (View from Inside of Enclosure) and energy receptor and power generation apparatus according to some embodiments;

FIGS. 4A-4F show a Quantum Signal Generator Module and Sample Circuit (Outside View of Full Enclosure) according to some illustrative embodiments, wherein FIG. 4A shows physical shielding, FIG. 4B shows an energy harvesting mechanism, and FIGS. 4C-4F show a quantum information generator;

FIG. 5 shows an output/computer transmission and re-integration module according to some illustrative embodiments; and FIG. 6A shows an enhanced conceptual diagram according to some embodiments, FIG. 6B shows an enclosure and quantum signal generator according to some embodiments, and FIG. 6C shows a QREG Circuit for Quantum Signal Generator according to some embodiments.

II. TECHNICAL DESCRIPTION OF THE SYSTEM

Figure 4F:
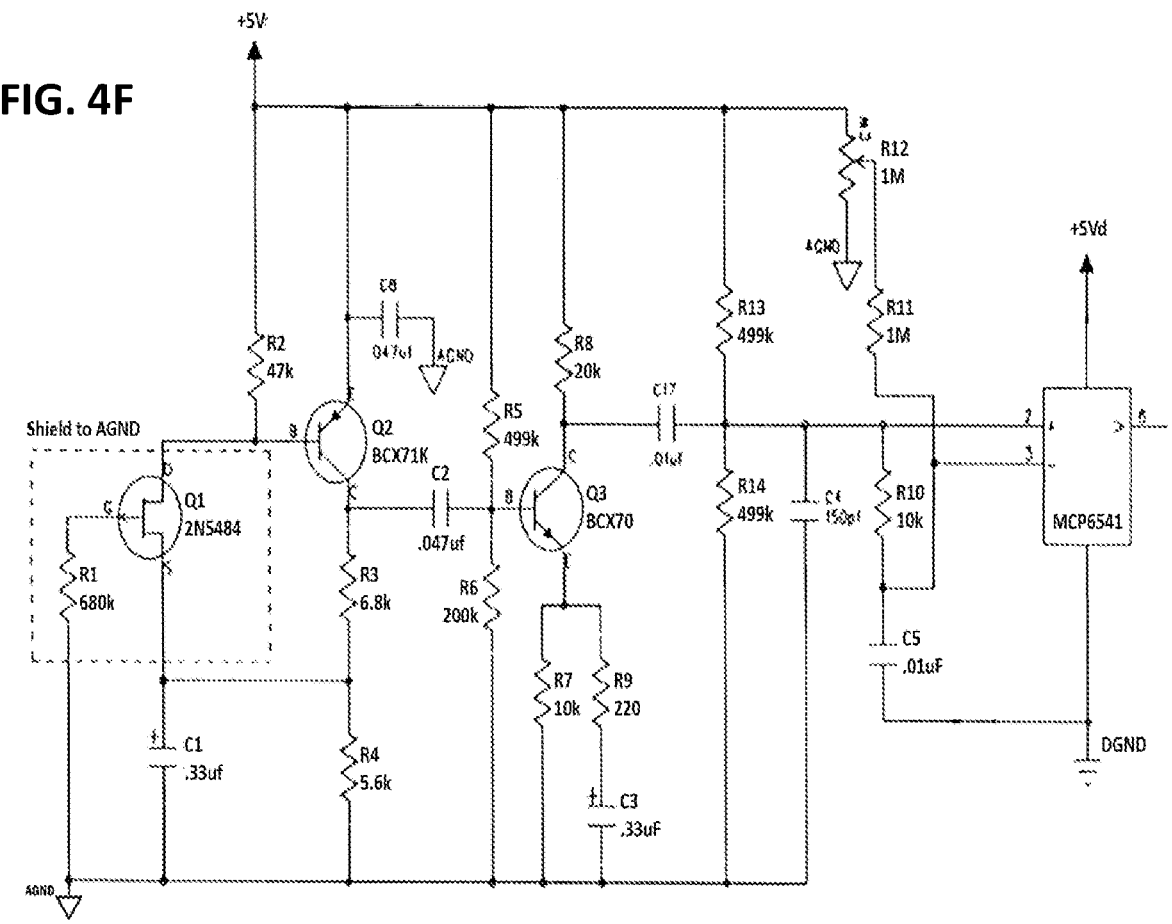

The system is comprised of several parts, described below as 4 conceptual sub-systems:

0. Shielding Enclosure

[FIG. 2: SHIELDING ENCLOSURE/EXTERNAL CASE—INTERNAL AND EXTERNAL VIEW]

The system itself is housed in a physical case ("enclosure") in the shape of an enclosed cube (or, in some embodiments, the shape of a sphere or quasi-sphere/spheroid) that is typically made of metal and may optionally have reflective mirrors on its interior walls. The enclosure can contain:

The physical case ("Enclosure"): Mechanically the case has some or all of:

Shield: The enclosure/case is made of a material that helps to shield the internal contents from mechanical damage and from electromagnetic signals, as well as to protect the internal light transmission mechanism. The material could be plastic (to shield from only mechanical influences), metals (to protect from electromagnetic and other effects), or multi-layers of composite material (e.g. mu-metal, metal, plastic, and) to be tuned to protect against particular external influences.

Computer/Network Interface Ports: The enclosure contains peripheral ports (such as, e.g. USB or Cat 5 Ethernet) that allow the device to be connected to a computer, tablet, cell phone, network router, or other information transfer and processing apparatus.

[Optional] Power Input: The enclosure may include a port to connect it to A/C power, a battery, a DC generator, a solar array, or another source of electrical power input. This source energizes the light plane, and, in some cases, data transmission services.

Photonic/Energy Generation Apparatus ("Light Power Plane"): Inside the enclosure there is a source of energy generation that is used by sub-modules inside the enclosure. In the preferred embodiment the energy generation apparatus involves several high-power light emitting diodes (LEDs) and reflective mirrors. The application of power to these LEDs saturates the internal chamber of the enclosure with high intensity light.

[1 or more] Photonic-Powered Information Generators ("Quantum Signal Generator Module"): Devices inside the enclosure that generate a signal based on quantum randomness, typically powered by the Energy Generation Apparatus. In the preferred embodiment the Quantum Signal Generator Module involves a quantum-tunneling-based true random event generator circuit enclosed in a quasi-spherical metal shell that is coated in photovoltaic cells. The module converts photonic from the Photonic Generator Apparatus ("Light Plane") into electrical current that powers the quantum-tunneling circuit to produce a signal that is then emitted through an orifice in the module by pulsing a laser diode.

A signal receiver and computer transmission module ("Output Module"): A circuit board or module inside the enclosure that receives signal from the quantum signal generator module(s) and converts them to a digital data stream that can be sent to a computer or via the network. In the preferred embodiment the signal receive module uses photo-transistors to receive input from the laser diode outputs of the Quantum Signal Generator Modules and then uses a micro-controller to process and convert the received signal into packets for transmission to a computer via USB.

In some embodiments there may be multiple enclosures with their own power sources connected together to a single communication device (e.g., USB hub, network router) to then transmit to a broader system. In this way, multiple quantum signal generator modules in an enclosure cascade with multiple enclosures to create significant data output to a single network or computer system.

1. The Light Power Plane

Unlike conventional random event generator systems and circuits which often exist on a single printed circuit board with common electrical traces and a shared power source (which may be through a USB hub, an AC adapter, a DC power source, or, in theory {but not known to be implemented} through a portable battery or capacitor), a key feature of this system is that it relies on light/photons for power generation and transmission, enabling sub-modules that are completely electrically isolated from one another.

This isolation is a function of the lack of physical conducting materials, the ability to create enhanced physical distance or positioning, and the ability to add multiple layers of electrical, magnetic, and vibratory shielding between sub-modules within the system.

In the preferred embodiment, within the housing there is a photon generation apparatus (i), which enables independent receptacles of isolated power (ii) that can be used by other parts of the system such as the quantum signal generator(s) as defined in (2).

[SEE: FIG. 3: LIGHT POWER PLANE—ENERGY GENERATION AND TRANSMISSION]

(i) Energy (Photon) Generation and Transmission Apparatus—One or more high-powered (e.g., on the order of 100 milliwatts or higher) light emitting diodes, lamps, or other high-flux photon emitting devices are connected to the external power supply and used to saturate the enclosure with high-intensity light. Sub-modules with receivers can be placed anywhere within the plane.

In the preferred embodiment, power is supplied by a highly filtered AC-DC adapter directly to the LEDs, which are fastened in multiple spots alongside the interior mirrored walls of the Housing. When electrical power is applied to the light emitting diodes, the interior of the housing is saturated with a large amount of high-intensity light in all directions, serving as a source of energy and making it possible to place power planes and/or light-powered apparatus anywhere within the enclosure. [FIG. 3A]

(ii) Photon/Energy Receptor and Power Generation Apparatus—Within the interior of the housing, in any suitable position that can receive light, photovoltaic/solar cells (or, e.g., photo-transistors) may be used to absorb light from the energy generation process and convert it back into an electrical current that are electrically and magnetically independent from those that led to the generation of the photos in the housing. An additional layer of optional shielding made of a protective material (e.g., mu-metal, copper, or a composite) further protects these electrons from interferences within or outside of the case. [See: FIG. 3B]

Collectively, this part of the system results in a physical unit ("backplane" or "Light Plane") that can uniquely and discretely power several additional modules or devices housed within it on a common power source while keeping each module fully and completely electrically isolated.

2. The Quantum Signal Generation Module(s)

[See: FIG. 4: QUANTUM SIGNAL GENERATOR MODULE AND SAMPLE CIRCUIT]

The signal generation module includes:

(i) Physical shielding [See FIG. 4A]—A physical shield placed around the information generator to help further reduce the influence of unintended signals (e.g., RF interference, electric fields and magnetic waves.) This shield is often comprised of one or more layers of metallic material such as copper or aluminum (to attenuate fields in most frequencies) or alloys and materials such as mu-metal (to attenuate fields and effects of other frequencies such as low frequency magnetic waves.)

The shielding may secondarily serve the purpose of creating isolation form vibration, sounds, and even to create temperature differentials. It may also be suspended on multiple axes.

One major benefit of the Power Plane design of this approach is that the shielding can be fully enclosed, which limits its permeability by fields; and because the design requires no wires or long electrical conducting traces that could/would otherwise serve as an inadvertent antennae for stray electrical or magnetic signals, the shield is particularly effective. The shield may also take shapes such as entirely spherical shapes, which have been shown to be most effective for reducing interference but otherwise would be infeasible (or even impossible) without creating an amplifying antenna under conventional electrical setups.

The design allows not only for a uniquely potent shield at the physical layer (due to lack of permeability and no traces in or out), but removes the possibility of outside interference.

(ii) Energy harvesting mechanism [See FIG. 4B]—The apparatus must have a mechanism to receive power from the Light Plane. In the preferred embodiment this apparatus consists of several solar cells covering the surface area of a shield surrounding the device (described in iii). The cells are connected together in series and parallel to provide a desired voltage (in this case 5V) and current (in this case up to 100 ma) and fed through a voltage regulator with a passive filter for signal smoothing. When placed into the Light Plane described in "1" this module of the signal generator generates a completely pure and isolated power supply that can feed into the device.

(iii) Quantum information generator [See FIG. 4C, 4E, 4F]—An circuit that uses a "quantum entropy source" (e.g. a reverse biased diode, a laser beam traversing a half-silvered mirror, a radioactively decaying material triggering a counter, a field effect transistor, or, etc.—as described, e.g., in the above-listed U.S. Pat. Nos. 9,152,381; 9,858,041; and 10,896,024) to create an signal based on quantum randomness. In its purest form this signal is entirely unpredictable by conventionally known methods and cannot be influenced by external electric and magnetic fields, vibration, temperature, or other effects.

In the preferred embodiment, the signal generation comes from a reverse biased diode or a field effect transistor ("source"). The output of the source is amplified by a series of transistors and/or an analog operational amplifier and filtered so that it provides a signal with a virtually flat spectrum noise source in some specified range (e.g., 20 hz to 10 Khz or 10 Khz to 100 MHz.) This signal is then passed to the transmitter as described in (iv).

(iv) Signaling Module—The analog waveform generated by the Quantum Information Generator (i.e. in "iii") is processed to be converted into a light signal that can be sent from the Signal Generation Module [2] through the Light Plane [1] and received by an output Module (e.g. [3]) to be sent to a computer.

In the preferred embodiment of the system, the analog signal from the quantum information generator is fed into a digital comparator where it is compared to a moving average of its own reference voltage such that the output of the comparator is 50% likely to generate an "On" signal and 50% likely to generate an "Off" signal. This stream of "on" and "off" signals ("Digital Bit Stream") is then used as the input into a single transistor, which drives a laser diode pointing outward through a pinhole in the signal generation module.

Optionally: The pinhole from the signal generation module may make use of a fiber optic cable or coated metal "guide rail" that carries the light from the laser to the Output Module [III] without causing or allowing any interference from the Light Plane. In other situations the wavelength of the laser light is selected to be a different color (e.g. green, red, or infrared) from that which is used to power the Light Plane (e.g. a color different from the laser color) and the output module receiving apparatus is filtered so as to only receive light from the signaling module/"Light output orifice" [See; FIG. 4A]

The combined effect of this sub-module is to have an entirely electrically isolated and self contained system that takes as input photonic energy from the Light Plane, uses said photons to excite electrons in a quantum field (e.g. in the field effect transistor), powers a filtering and amplification circuit (e.g. in the analog amplifier, filter, and comparator as described), and converts that output into a light-based signal whose information content is derived solely from the Light Plane and the quantum process used in the quantum information generation step.

This module is, further, heavily shielded from outside interference by virtue of its electromagnetic isolation and thick shell/shield, with the only access to outside sources being through the pinhole that transmits the laser light.

3. The Output Module (Computer Transmission/Electrical Re-Integration)

[See: FIG. 5: OUTPUT/COMPUTER TRANSMISSION AND RE-INTEGRATION MODULE]

The purpose of the output module is to receive a light signal from [2] and allow it to be transmitted as digital information on a practical useful device such as a physical computer, laptop, smart-phone, or an information processing network. The module has several sub-components:

(i) Electrical power plane—A physical electrical connection that can be shared with other devices, such as the USB bus of a computer. This is a separate/distinct electrical plane than that created by the Light Power Plane and is fully isolated.

(ii) Receiver Apparatus—An electrically isolated receiver capable of taking input from the signaling module (iv) of the Quantum Information Generation Module (2) and converting it into a separate electrical signal that can be transmitted along the electrical power plane.

(iii) MCU/CPU (or Digital Transmitter)—A sub-module for converting the output of the receiver to something digitally transmittable to other devices. This can for example be a micro-controller connected to a USB port that connects to a computer, or a micro-controller connected to an ethernet port.

(iv) Communication Protocol—A sub-module or software run in this module (e.g. in the MCU/CPU) for making the data broadly accessible to other devices such as, e.g. computers, laptops, servers, smartphones, or IoT devices, etc.

In the preferred embodiment, the receiver apparatus is a single photo-transistor configured to match the wavelength of the output of light coming from the laser diode in the Quantum Signaling Module. When light from the signaling module hits the phototransistor, it drives an input pin on a micro-controller, which samples these changes at some rate (e.g. 10,000 times per second, frequency matched to align with the signaling apparatus) and transmits them to a computer using a standard communication protocol such as USB data transfer or TCP/IP.

In alternative embodiments the receiver is itself a wavelength- and frequency-matched phototransistor or a photoresistor and analog processing is used to generate a separate analog signal in the Output module, where it can then be processed by an analog to digital converter and made accessible to a PC via the USB, Serial, or TCP/IP channel. Software in the MCU may multiplex or perform other algorithmic processing operations (as described, e.g., in the above-listed U.S. Pat. Nos. 9,152,381; 9,858,041; and 10,896,024) to improve the quality of the output signal.

4. Compute and Additional Processing/Modularization

Additional modifications and modules are possible. Examples:

- An internal processing unit may be built to integrate the input from multiple quantum information generators [2] and signaling apparatus on the same backplane. This processing unit may run custom software to control outputs based on the interaction of multiple quantum information generators before sending data to the output module.
- The Light Plane itself may have its power supply (e.g. the power enabling the LEDs) that turns off one or multiple LEDs in the Light Plane based on input from a computer or, e.g. from other quantum signaling modules, this varying the intensity (or even the dominant wavelength) of the light in the case and/or adding pulsations.
- In some embodiments the apparatus may be simplified to use an opto-isolator or compared to an opto-isolator, though most opto-isolator configurations will not obtain the same quality of effects due to the fact that they lack many of the benefits of the invention such as the ability to create significant physical distance between the signal generator and the decoder, the ability to operate in temperature controlled environments, and the ability to mechanically induce or attenuate vibrations, sounds and other effects.
- The spheres of the Quantum Signal Generator Module (or any shielded sub-module) may be super cooled or placed into a temperature regulated chamber, to further mitigate the effects of any interference from the outside environment. In such a case the laser channel may extend far away from the apparatus.
- Computations on data in the device may be displayed on a visual indicator outside of the box, such as on an LCD screen or other display.
- In some embodiments multiple signal generators, modules, or enclosures, may be modularly combined together.

III. BENEFITS

Compared to existing systems and conventional electronic-based random event generators, the system has several key advantages:

(1) Significant improvement in the quality of the quantum signal by removing external electrical influences. All physical random event generators suffer from the problem of radio frequency interference and sensitivity to any form of electrical or magnetic transmissions in the local environment. This is true not only from electrical devices in close proximity to the apparatus may extend to all devices in a house or connected to an electrical grid interacting with the generator device.

For example: a random event generator connected by a USB cable that is powered by the USB bus will receive not only unwanted noise from the operations of the computer but will be impacted by other apparatus running in the house such as, e.g. incandescent lights, air conditioners, a refrigerator, washers and dryers, and other equipment.

Most devices work around these interferences by making use of significant active and passive filtering circuits, ferrite beads, cabling design, and digital signal processing—but the effects are never truly attenuated.

By powering each signal generator with, e.g. solar cells that are super-saturated with photon emissions from LEDs reflected through multiple mirrors in the case, the generators are effectively completely electrically isolated from such powerline interference.

(2) Significantly improved shielding from external sources. Another method that is employed by many random event generators is to isolate a specific portion of a circuit board (and/or the entire random event generator apparatus itself) from the physical environment by encasing it in a protective shielding. This shielding may be made of metal such as copper or aluminum and connected to the ground plane of the circuit.

In extreme instances (rarely implemented due to higher cost) the signal generator may be placed onto a separate circuit board to create even further isolation from the rest of the digital or analog circuitry being used to interface the generator with a computer or other output device.

The problem with these designs is that even a small physical via (e.g. a thin copper trace on a printed circuit board running from the signal generator to a conversion circuit) or wired connection (e.g. a metallic wire, insulated or not making a similar connection) will serve to act as an antenna that can (and will) emit and collect stray signals from the outside environment.

In this design, the removal of direct physical (and electrical) contact between the quantum information source and conventional power apparatus also significantly increases the shielding opportunity:

(a) Removal of antennae in and around the shield limits inflows
(b) The shield may be of substantial thickness and further physically separated from the rest of the circuit.
(c) The shield can take shapes that would otherwise be impractical if mounted on typical circuit board. For example: a spherical shape can maximize shielding potential and is easily implemented without having to have wires.

(3) Ability to receive additional signaling information in the form of photonic effects and quantum phenomena interacting with the light-based power plane. Whereas an electrically based power-plane is susceptible to interference from virtually any and all objects in the external environment, the light-based power plane is influenced only by perturbations in the light, which enables the following benefits:

a. The light based supply (especially when super-saturating the receivers) in an enclosed case cannot be disturbed by any external fields.
b. The light-based supply and super-saturated receivers can generate their own purely quantum-level effects to add to the robustness of the overall quantum source.
c. The light source itself can be modulated by other signals. For example: the devices can be cascaded together and the light plane itself modified to encode information from another quantum signal generator.

The combined effect of this system is a form of random event generator that can be virtually impervious to known forms of physical interference, electrical feedback from it's own generation and host system, and/but/yet can receive additional sources o quantum information through the photonic power plane upon which the signal generator resides.

This leads to superior purity and flexibility in output at a far lower cost and complexity than would be possible using traditional electrical circuits, and it can be modularly expanded in many ways—such as to increase isolation, regulate temperature, or to control multiple sources on a similar physical light channel even though they are otherwise completely electrically and magnetically isolated.

IV. ADDITIONAL NOTES

The use of the term "noise" or "signal" can be read as having dual meanings in this application. In many alternative and conventional applications of related technologies, people will talk of "noise" (e.g. johnson noise, shott noise, quantum noise) and not make a distinction between that noise which is generated for a specific purpose (e.g. as in a quantum signal) and that noise which is a consequence of the environment and/or not desirable (e.g. electromagnetic interference, "noise" on an incoming power line, stray radio waves, etc).

In this application we differentiate between the use the term "Quantum Signal" to refer to that which his generated by measuring true quantum phenomena with a known/define statistical distribution rooted in heisenberg uncertainty but whose direct outcome is unknowable by any traditional physical means, from environmental or other forces in the form of unwanted electrical, thermal, magnetic, vibratory, or radio frequency interference The mechanism of Transmission from the Quantum Signal Generator to the Receiver Needs not necessarily be accomplished by light. It can also include mechanical means such as sound (i.e. transmission with a speaker, received by a microphone), piezo-electric vibrations, air-pressure transfer, or other mediums not affected by or subject to EMI. The downside of many of these mechanisms is that they are often more bandwidth limited than light or may be more susceptible to crosstalk—but nonetheless they can be used to accomplish many of the same purity mechanisms.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A self-powered system that implements a Quantum Signal Generator where said Quantum Signal Generator is powered by light, wherein the system embodies said Quantum Signal Generator where said Quantum Signal Generator is powered by one or more photovoltaic cells and completely electrically isolated from other circuits.

2. The system as in claim 1, where said Quantum Signal Generator is combined with a driver circuit that pulses a light emitting diode or laser for the purpose of transmitting an output signal.

3. A self-powered system that implements a Quantum Signal Generator where said Quantum Signal Generator is powered by light, wherein a single enclosure contains multiple fully electrically isolated Quantum Signal Generators feeding a single output.

* * * * *